US012119980B2

(12) United States Patent
Parker et al.

(10) Patent No.: US 12,119,980 B2
(45) Date of Patent: Oct. 15, 2024

(54) DEPLOYING AND CONFIGURING NETWORK FUNCTIONS BASED ON A HIERARCHICAL CONFIGURATION MODEL

(71) Applicant: Microsoft Technology Licensing, LLC, Redmond, WA (US)

(72) Inventors: Ronald Mark Parker, Manchester, MA (US); Mark Gordon Libby, Groton, MA (US); Michael Anthony Brown, McKinney, TX (US); Haibo Qian, Frisco, TX (US); Rahul Bose, Westford, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/087,465

(22) Filed: Dec. 22, 2022

(65) Prior Publication Data
US 2024/0214258 A1   Jun. 27, 2024

(51) Int. Cl.
*G06F 15/173* (2006.01)
*G06F 15/16* (2006.01)
*H04L 41/044* (2022.01)

(52) U.S. Cl.
CPC ................. *H04L 41/044* (2013.01)

(58) Field of Classification Search
CPC ........................ H04L 41/044; H04L 41/045
USPC .................. 709/202–203, 223–224
See application file for complete search history.

(56) References Cited

U.S. PATENT DOCUMENTS

| 11,528,190 | B2 * | 12/2022 | Mallipudi | ............. H04L 41/022 |
| 11,743,144 | B2 * | 8/2023 | Duggal | ............... H04L 41/5019 709/223 |
| 2019/0042326 | A1 * | 2/2019 | Chilikin | ................. G06F 9/5077 |
| 2019/0089588 | A1 * | 3/2019 | Xu | ........................ H04L 41/0897 |
| 2019/0109765 | A1 * | 4/2019 | Shibata | .................... H04L 41/40 |
| 2020/0036593 | A1 | 1/2020 | Sethi | |
| 2020/0229080 | A1 * | 7/2020 | Xu | ........................ H04L 41/0806 |
| 2021/0409277 | A1 | 12/2021 | Jeuk | |
| 2022/0103427 | A1 * | 3/2022 | Mallipudi | ............. H04L 41/082 |
| 2023/0093673 | A1 * | 3/2023 | Narasimha Swamy ..................... H04L 41/145 455/446 |

(Continued)

FOREIGN PATENT DOCUMENTS

WO   2020041073 A1   2/2020

OTHER PUBLICATIONS

International Search Report and Written Opinion received for PCT Application No. PCT/US2023/035940, Feb. 5, 2024, 20 pages.

*Primary Examiner* — Bharat Barot
(74) *Attorney, Agent, or Firm* — Ray Quinney & Nebeker; James Bullough

(57) ABSTRACT

The present disclosure relates to systems, methods, and computer readable media for receiving and processing a request to deploy network functions across one or more deployment areas of a telecommunications network. Systems described herein process a request by applying a hierarchical configuration model including a hierarchy of configuration management instructions that can be applied to a request that complies with a format of the hierarchical configuration model. Features described herein facilitate deployment of unique configuration instructions across multiple network functions and across multiple deployment areas based on a single request and without further user interaction with respect to each of multiple network functions.

20 Claims, 8 Drawing Sheets

(56) References Cited

U.S. PATENT DOCUMENTS

2023/0100276 A1\* 3/2023 Basur Shankarappa ............... H04L 41/0895
718/1

\* cited by examiner

DEPLOYING AND CONFIGURING NETWORK FUNCTIONS BASED ON A HIERARCHICAL CONFIGURATION MODEL

BACKGROUND

Cellular networks can provide computing devices (e.g., mobile devices) with access to services available from one or more data networks. A cellular network is typically distributed over geographical areas that often include base stations, core networks, and/or edge networks that collectively provide a variety of services and coverage to end-user devices (e.g., mobile devices). The devices of the cellular network provide reliable access to a data network by mobile devices over a wide geographic area. In many instances these cellular networks provide mobile devices access to the cloud.

As noted above, cellular networks include a number of network components. For example, cellular networks often include a radio access network (RAN), an edge network, and a core network. In many instances, the RAN may include base stations having components thereon that communicate wirelessly with user devices (e.g., mobile devices or other endpoints) and facilitate interaction with other components of a core network and/or cloud computing system. In addition, the core network may include a variety of functions (e.g., network functions) and nodes that provide services to clients.

In recent years, cellular networks have provided a variety of network functions that enhance capabilities of services and devices on a cellular network. For example, many core networks provide access to a variety of network functions having a wide variety of configurations that control how the network function operates within a respective computing environment. In addition, network functions may have different applicable configurations based on where a network function is implemented geographically, the specific hardware on which the network function is deployed, preferences of individual customers with respect to specific deployments, as well as other factors. This increased complexity and scale is often limited by conventional deployment methods, both in scalability and accuracy. Indeed, where conventional systems often require each network function to be individually configured by a customer, performing large-scale deployments can be slow, time-consuming, and prone to inaccuracies and inefficiencies.

These and other problems exist in connection with performing deployment and configuration of network functions across a communication network.

DETAILED DESCRIPTION

Figure 1:
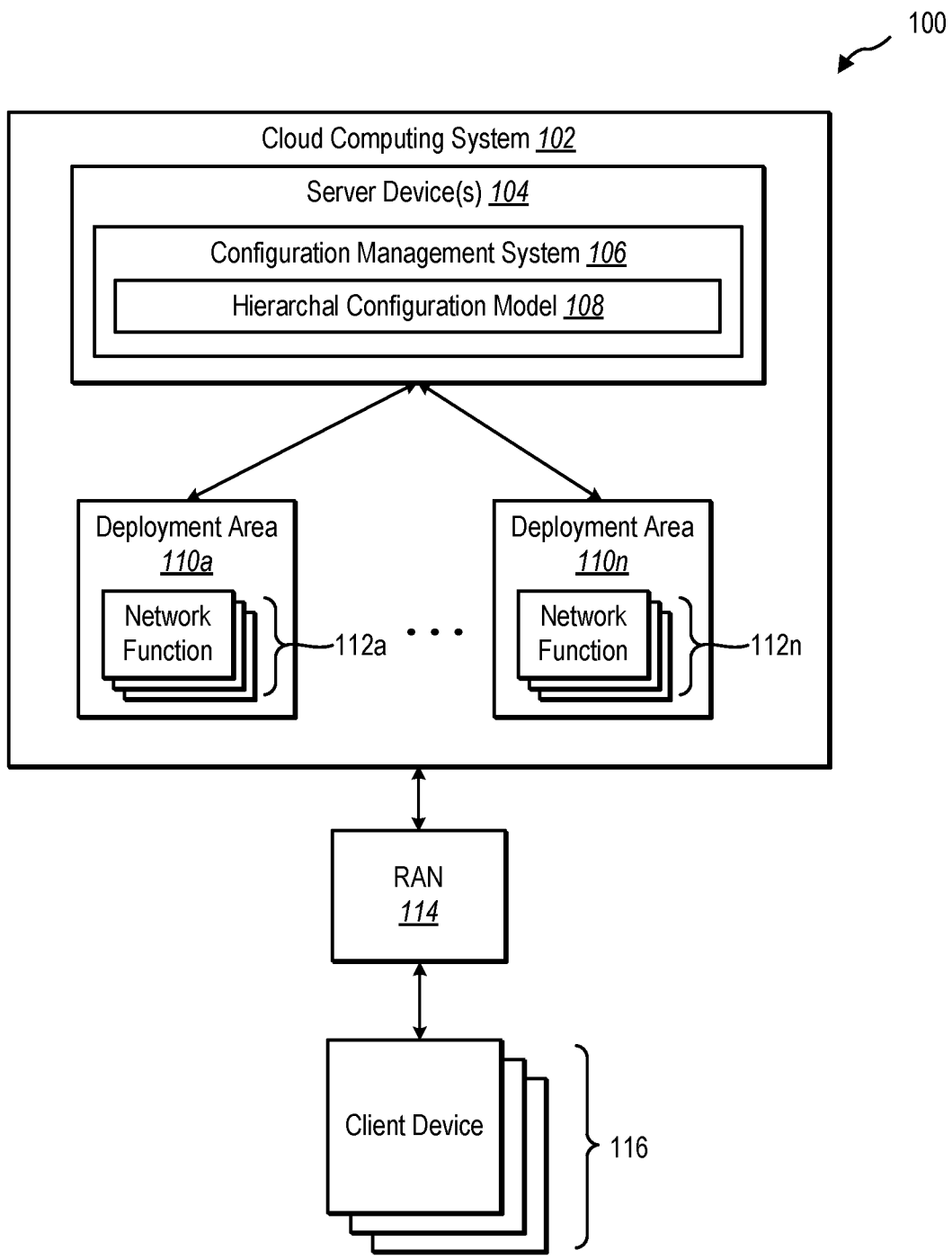
FIG. 1 illustrates an example environment including an implementation of a configuration management system for filtering and fanning out a deployment request on a cloud computing system.

The present disclosure relates to systems, methods, and computer readable media for receiving and processing a request to deploy a plurality of network functions across one or more deployment areas in a telecommunications network. In particular, as will be discussed in further detail below, the present disclosure involves processing a request based on application of a hierarchical configuration model including a hierarchy of configuration management instructions that facilitate causing a plurality of network functions to be deployed across deployment areas of the telecommunications network. As will be discussed herein, features and functionalities described herein may facilitate deployment of unique configuration instructions across multiple network functions and across multiple deployment areas based on a single request (e.g., and without further user interaction with respect to each of multiple network functions).

As an illustrative example, a configuration management system may be implemented on a server device within a telecommunications network. The configuration management system may receive a request including instructions for deploying a plurality of network functions across a subset of deployment areas of a plurality of deployment areas of the telecommunications network. The configuration management system may identify and apply a hierarchical configuration model to the request to generate deployment instructions for the request. Applying the hierarchical configuration model to the request may include identifying a node of the hierarchical configuration model associated with the subset of deployment areas and determining configuration instructions for a plurality of network function instances to be deployed across the deployment area(s). The configuration management system may further deploy or otherwise configure the network function instances across the identified deployment areas in accordance with configuration management instructions referenced in the hierarchical configuration model.

The present disclosure includes a number of practical applications that provide benefits and/or solve problems associated with deployment network functions and configuring said network functions across deployment areas of a telecommunications network. Some example benefits are discussed herein in connection with various features and functionalities provided by a configuration management system. It will be appreciated that benefits discussed herein are provided by way of example and are not intended to be an exhaustive list of all possible benefits of the configuration management system.

Features and functionality of the configuration management system provide a mechanism whereby deploying and configuring network functions can be performed automatically (e.g., without user input with respect to deployment of each network function). In particular, by utilizing a hierarchical configuration model in accordance with one or more embodiments described herein, the configuration management system can process a request (e.g., a single request) to deploy any number of network functions across one or multiple deployment areas. Indeed, as will be discussed in further detail below, the configuration management system can apply the hierarchical configuration model to a request to filter the request (e.g., restrict the deployment to a subset of deployment areas) and fan out the request (e.g., repeat one or more configuration instructions across multiple instances of network functions) as well as other deployment actions discussed herein.

By utilizing a hierarchical configuration model, the configuration management system may process requests to deploy a wide variety of network functions. Indeed, where configuring network functions often requires an individual (e.g., a customer) to have knowledge about unique characteristics of a specific network function or network function type, the configuration management system enables a user to more generically request deployment of a set of network functions and allow the hierarchical configuration model to apply specific configuration management instructions across multiple instances of network functions based on instructions referenced by individual nodes or branches of nodes from the hierarchical configuration model.

In addition, by utilizing a hierarchical configuration model that has branches that are associated with respective deployment areas, the systems described herein can avoid conventional approaches in which a customer manually configures network functions differently depending on domain knowledge of the different geographic areas. This avoids a time-consuming and error-prone approach to confusing network functions across multiple deployment areas.

In addition, as noted above, this allows fanout of network functions across deployment areas in which configurations of the network function instances are modified across the deployment areas in accordance with the configuration management instructions referenced in the different branches of the hierarchical configuration model. This can be expanded to specific types of hardware, different types of network functions that may differ across deployment areas and/or across hardware nodes. Indeed, this provides a very customizable approach that scales in complexity with the expanding complexity and growing number of services provided by modern cloud computing systems.

As noted above, rather than requiring a customer to individually configure network functions, the configuration management system provides a mechanism whereby a customer can provide a single request pursuance to deploying network functions across multiple deployment areas. In one or more embodiments, this is accomplished by employing a request that includes an application programming interface (API) call which references nodes or branches of a hierarchical configuration model. Indeed, using single API call, an individual may indicate any number of network functions as well as deployment areas of a telecommunications network and any other identifiers that point to specific nodes or branches of the hierarchical configuration model. This unique format allows for the systems described herein to process a request in a way that filters, fans out, and customizes configurations of network function instances on computing resources of a telecommunications network.

The features and functionality of the configuration management system described herein provides an efficient and scalable approach that can be included in existing framework of telecommunications networks as well as expanded via modifications made to the hierarchical configuration model. Indeed, as the hierarchical configuration model can be updated and further customized, embodiments described herein provide a dynamic and scalable approach to automating configuration of network functions in a way that can accommodate changing network environments, new and modified network function types, and modifications to configuration management instructions based on additional information that becomes available over time.

As illustrated in the foregoing discussion, the present disclosure utilizes a variety of terms to describe features and advantages of a configuration management system within a variety of computing environments. Additional detail will now be provided regarding the meaning of some of these terms.

As used herein, a "cloud computing system" or "distributed computing system" may be used interchangeable to refer to a network of connected computing devices that provide various services to computing devices (e.g., customer devices). For instance, as mentioned above, a cloud computing system can include a collection of physical server devices (e.g., server nodes) organized in a hierarchical structure including clusters, computing zones, virtual local area networks (VLANs), racks, fault domains, etc. In one or more embodiments described herein a portion of the cellular network (e.g., a core network) may be implemented in whole or in part on a cloud computing system. In one or more embodiments a data network may be implemented on the same or on a different cloud computing network as the portion of the cellular network.

As used herein, a "telecommunications network" may refer to a system of interconnected devices that are distributed over geographical areas and which provide communication and data capabilities to end-user devices (e.g., mobile and non-mobile devices). In one or more embodiments described herein, a telecommunications network refers to a cellular network that includes radio access network (RAN) components, core network components, and network functions implemented on server nodes on the cellular network. In one or more embodiments described herein, the telecommunications network refers specifically to a fifth generation (5G) network environment; however, other implementations may include previous generations or future generations that make use of network functions implemented on computing devices of the telecommunications network.

As used herein, a "network function" may refer to an entity in a telecommunications network that provides access to one or more services or applications of the telecommunications network. A network function may refer to one of a wide variety of network function types corresponding to different unique or defined functions or services that may be provided via the telecommunications network. As will be discussed in connection with various examples, a network function may refer to a physical function, virtual network function, or any of a variety of types of network functions. Examples of network functions include, but are not limited to, session management functions (SMFs), user plane functions (UPFs), access and mobility management function (AMF), and any other type of function that can be implemented within a telecommunications network. Indeed, in one or more embodiments, a network function may refer to any function or entity in a telecommunications network (e.g., 2G, 3G, 4G, 5G or beyond cellular environment) that provides access to a service and/or application to a client of the telecommunications network.

In one or more embodiments described herein, a network function may have an associated configuration. As used herein, a "network function configuration," or simply "configuration" may refer to any information indicating rules, commands, or policies associated with operation or behavior of a network function within a framework of a telecommunications network. A configuration may include instructions associated with a lifecycle of a network function, such as a type of network function, general behavior of the network function, types of services that a network function is configured to provide, a timeline of a lifetime of the network function, etc. A configuration may additionally include instructions associated with configuration management (CM) policies, such as communication restrictions, security policies, deployment-area specific policies, or other behavior related rules or instructions. Examples of configurations and various configuration policies will be discussed in further detail below.

As used herein, a "deployment area" may refer to an area within a telecommunications network within which a network function is deployed. In one or more embodiments, a deployment area may refer specifically to a geographic area, such as a datacenter, a geographic region, a cluster (or group of clusters) of devices, an edge network, or other physical, logical, or geographic grouping of devices. In one or more embodiments described herein, a deployment area refers to any grouping of devices as defined within a hierarchical configuration model. A deployment area may refer to a small grouping of devices (e.g., a specific server rack) or, alternatively, may refer to a large grouping of devices (e.g., an entire datacenter or set of multiple datacenters).

As used herein, a "request" or "deployment request" may refer to an expression of intent or command to deploy one or more network functions on the telecommunications network. In one or more embodiments, a request refers to an expression of intent to deploy one or more physical and/or virtual network functions at one or across multiple deployment areas. In one or more embodiments, a request refers to an expression of intent to inject or deploy a configuration (or multiple configurations) to instances of network functions that are currently deployed or pre-deployed (e.g., pre-provisioned). Indeed, a request may refer to an expression of intent to initiate a new deployment, modify an existing deployment, or simply modify a configuration of a deployment of network function(s) on the telecommunications network.

Thus, in one or more embodiments, processing a request for deployment of network functions may involve deploying network functions, modifying previously deployed network functions, or injecting configuration policies in pre-deployed network functions, or some combination thereof. Moreover, as will be discussed in connection with one or more embodiments described herein, an act of deploying a network function may refer to an act of setting up or initiating a network function instance, an act of modifying an existing deployment, an act of injecting policies, rules, or other configuration management instructions into an existing or pre-provisioned network function, decommissioning a previously deployed network function or some combination of the above.

In one or more embodiments described herein, the configuration management system facilitates deployment of a request based on characteristics of a hierarchical configuration model. As used herein, a "hierarchical configuration model" refers to a diagram (e.g., a class diagram) including nodes that are organized in a hierarchical manner and having associated configuration instructions associated therewith. As will be discussed in further detail below, a hierarchical configuration model may include a top-level node (e.g., a mobile packet core) having one or more configuration management policies that are globally applicable to network functions on a telecommunications network. The hierarchical configuration model may additionally include nodes and/or branches associated with different deployment areas of the telecommunications network. The hierarchical configuration model may also include configuration management nodes and/or branches that include certain configuration management policies. Examples of nodes and branches of example hierarchical configuration models are discussed in further detail below in connection with various embodiments.

Additional detail will now be provided regarding implementation of a hierarchical configuration model by a configuration management system in relation to illustrative figures portraying example implementations. For example, FIG. 1 illustrates an example environment 100 including a cloud computing system 102 on which a telecommunications network can be implemented. As shown in FIG. 1, the cloud computing system 102 includes one or more server device(s) 104 having a configuration management system 106 implemented thereon. As further shown, the configuration management system 106 may include a hierarchical configuration model 108, which will be discussed in further detail below.

As shown in FIG. 1, the cloud computing system 102 may include a plurality of deployment areas 110a-n having network functions 112a-n implemented (e.g., deployed, configured) thereon. As noted above, the deployment areas 110a-n may refer to geographic areas including groupings of network devices (e.g., server nodes) on the cloud computing system 102. For example, a first deployment area 110a may refer to a first datacenter with additional deployment areas referring to other datacenters. In one or more implementations, the deployment areas 110a-n may be more granular in nature, such as a physical or logical grouping of devices within a single datacenter, or a mix of different sized groupings of devices as may fit a particular embodiment. In one or more embodiments, the deployment areas 110a-n are defined as branches (e.g., deployment area branches) of the hierarchical configuration model 108. The cloud computing system 102 may include any number of deployment areas 110a-n.

The network functions 112a-n may include any number and variety of network functions as may be deployed on respective deployment areas 110a-n. For example, a first set of network functions 112a may include any number and variety of network function types as are configured to be deployed on nodes of the first deployment area. Each of the additional sets of network functions on the additional deployment areas may similarly include any number and variety of network function types.

As further shown in FIG. 1, the environment 100 may include a radio access network (RAN) 114 and a plurality of client devices 116. It will be appreciated that components 102-116 of the environment 100 may refer to portions of a communication environment (e.g., a cellular network, such as a 5G network). For example, the components 102-116 illustrates in FIG. 1 may form a public or private cellular network, which include a RAN, core network, and data network. In one or more embodiments, components of a core network or RAN 114 may be implemented as part of an edge network, datacenter, or at various locations as may serve a particular implementation of the environment 100.

The client devices 116 may refer to a variety of computing devices or device endpoints including, by way of example, a mobile device such as a mobile telephone, a smartphone, a personal digital assistant (PDA), a tablet, or a laptop. Alternatively, one or more of the client devices 116 may refer to non-mobile devices such as a desktop computer, a server device (e.g., an edge network server), or other non-portable devices. In one or more embodiments, the client devices 116 refer more generally to any endpoint capable of communicating with devices on a cloud computing system 102, such as Internet of Things (IoT) devices, or other Internet-enabled devices. In one or more embodiments, the client devices 116 refer to applications or software constructs on corresponding computing devices.

The RAN 114 may include a plurality of RAN sites. In one or more embodiments, each RAN site may include one or more base stations and associated RAN components. While the RAN 114 may include components that are entirely separate from a core network, one or more embodiments of the environment 100 may include one or more RAN components or services traditionally offered by a RAN site that are implemented on the cloud computing system 102 (e.g., as part of a core network). For example, while FIG. 1 illustrates the RAN 114 being entirely separate from the infrastructure of the cloud computing system 102, it will be appreciated that network functions 112a-n may provide services (e.g., physical and/or virtualized functions) that collectively make up a core network, RAN 114, or other portion(s) of a telecommunications network.

As noted above, the configuration management system 106 may have a hierarchical configuration model 108 implemented thereon. As will be discussed in further detail below, the configuration management system 106 may create, modify, update as well as implement a hierarchical configuration model 108 to aid in deploying network functions across one or multiple deployment areas 110a-n. For example, the configuration management system 106 may receive and process a request having a format (e.g., an API call) that complies with the hierarchical configuration model 108.

In particular, the configuration management system 106 may process the request by applying the hierarchical configuration model 108 to the request to perform a combination of filtering the request, fanning out the request, and other acts related to deploying any number of network functions referenced by the request across one or multiple deployment areas 110a-n of the cloud computing system 102. This process of deploying network functions in accordance with the request can be done automatically without receiving additional user input beyond the initial request.

Figure 2:
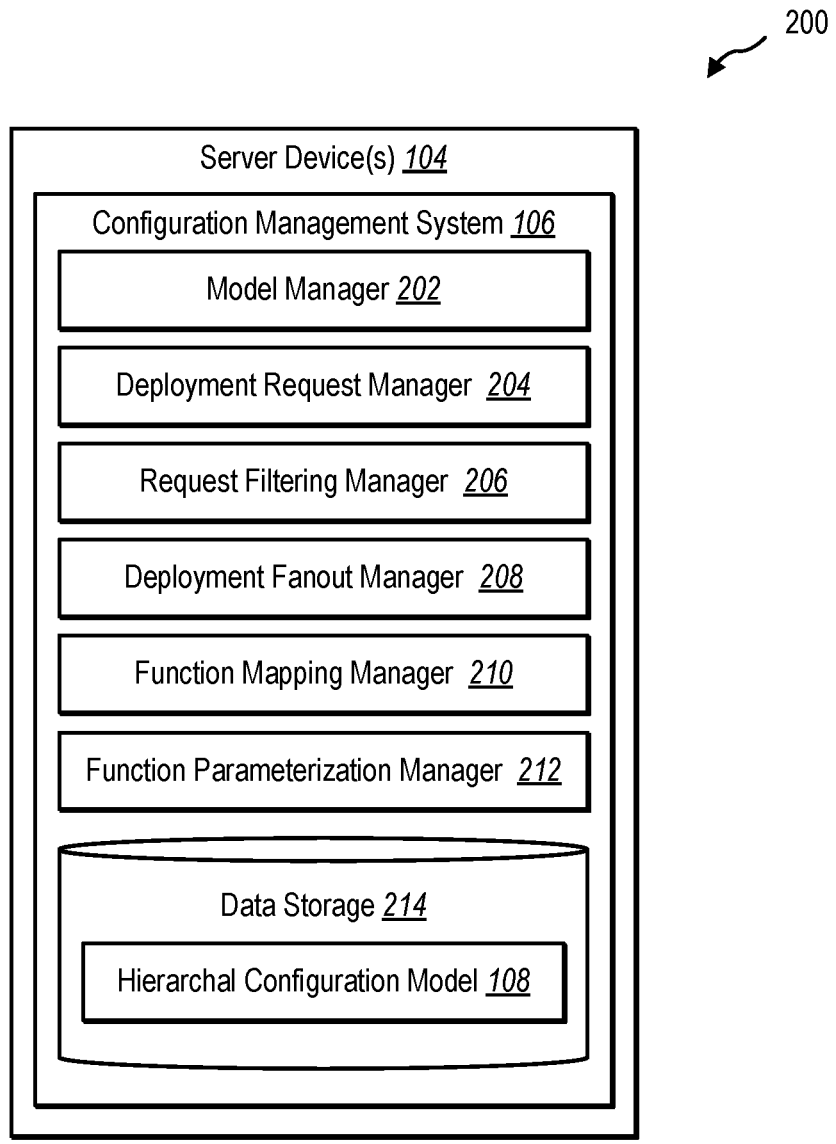
FIG. 2 illustrates an example implementation of a configuration management system on one or more server devices in accordance with one or more embodiments.

Additional information in connection with implementing the hierarchical configuration model 108 and processing incoming deployment requests will now be discussed in further detail in connection with FIG. 2. In particular, FIG. 2 illustrates a computing environment 200 including an example server device(s) 104 having a configuration management system 106 implemented thereon. In accordance with examples above, the configuration management system 106 may utilize a hierarchical configuration model 108 stored or otherwise maintained on the server device(s) 104 to intelligently deploy network functions in accordance with a received deployment request. It will be appreciated that the server device(s) 104, configuration management system 106, and hierarchical configuration model 108 refer to similar components as discussed above in connection with FIG. 1.

As shown in FIG. 2, the configuration management system 106 may include a number of components for performing various functions described herein. For example, the configuration management system 106 may include a model manager 202, a deployment request manager 204, a request filtering manager 206, a deployment fanout manager 208, a function mapping manager 210, and a function parameterization manager 212. As further shown, the configuration management system 106 may include a data storage 214 having the hierarchical configuration model 108 maintained thereon.

As will be discussed in further detail below, each of the components 202-214 of the configuration management system 106 may provide features and functionality of implementations described herein. In addition, while certain components are described in connection with software or hardware modules implemented on a single server device 104, it will be appreciated that one or more of the components 202-214 may be implemented across a plurality of devices. By way of example and not limitation, the data storage 214 may maintain the hierarchical configuration model 108 on a first device while one or more of the additional components 202-212 are on a different server device (or multiple different server devices). In addition, while various features are described in connection with individual components of the configuration management system 106, it will be appreciated that features described in connection with different components may be implemented by the same component or may be implemented across multiple components illustrated herein.

As just mentioned, the configuration management system 106 includes a model manager 202. The model manager 202 may perform features related to creating, updating, or otherwise managing the hierarchical configuration model 108. In one or more embodiments, the hierarchical configuration model 108 is managed by an administrator of the cloud computing system 102 or other individual having access to the hierarchical configuration model 108 and who has domain knowledge of the cloud computing infrastructure. For example, the hierarchical configuration model 108 may be managed by an individual or team that has knowledge or awareness of similarities and differences across different deployment areas of the cloud computing system 102.

In one or more embodiments, the model manager 202 may facilitate addition, removal, and/or modification of nodes or branches of the hierarchical configuration model 108. For example, the model manager 202 may add new nodes to the hierarchical configuration model 108 based on additional deployment areas being added to the cloud computing system 102 or based on specific groupings of devices within the cloud computing system 102 being defined as a deployment area. As additional network functions are added to the cloud computing system 102 (or to specific deployment areas), additional nodes may be added to the hierarchical configuration model 108 to reflect the additional network functions.

In addition to adding deployment areas and network function types, the model manager 202 may facilitate addition of or modification of configuration management branches of the hierarchical configuration model 108. For example, as network function profiles are updated, or as security features are improved over time, modifications to one or more nodes of the hierarchical configuration model 108 may be updated to reflect the changes to the various policies or features. As will be discussed below, this enables a quick and efficient rollout of updates to configurations across network functions deployed across multiple deployment areas.

As mentioned above, the configuration management system 106 includes a deployment request manager 204. The deployment request manager 204 may manage receipt and processing of deployment requests received by customers of the cloud computing system 102. As noted above, a deployment request (or simply "request") may refer to an API call having a format that is compatible with a format of the hierarchical configuration model 108. For example, the API call may include text having fields that reference specific nodes and/or branches of the hierarchical configuration model 108.

In one or more embodiments, the deployment request manager 204 receives a request and verifies that the request is valid and can be processed based on the hierarchical configuration model 108. For example, the deployment request manager 204 may receive a request and verify that it follows a particular format that complies with a structure of the hierarchical configuration model 108. In addition, the deployment request manager 204 may verify that the instructions included within the request do not violate any specific or predetermined deployment policies that may be carried out by the configuration management system 106.

In one or more embodiments, the deployment request manager 204 provides an interface that enables a customer to compose a deployment request. For example, in one or more embodiments, the deployment request manager 204 provides an interface including any number of features of network functions (e.g., network function types, network function characteristics), deployment areas, and/or configuration management instructions that may be included within a request. Indeed, the deployment request manager 204 may provide an interface via a client device to enable a customer to generally indicate details of a deployment (e.g., number of network functions, deployment areas of the network functions, etc.)

In one or more embodiments, the options provided by the deployment request manager 204 are limited to the nodes that exist within the hierarchical configuration model 108. For example, the deployment request manager 204 may provide a finite number of configuration options via an interface and compose a request based on the selected configuration options. Alternatively, where a customer composes a request via a text-based input, the deployment request manager 204 may simply verify that the request has a format that complies with the hierarchical configuration model 108.

Additional detail will now be discussed in connection with processing a received request based on application of the hierarchical configuration model 108 to the received request. In one or more embodiments, this processing of a received request involves filtering the request, fanning out the request, mapping the request, and parameterizing the request. Addition details in connection with these stages of processing a request will be discussed in further detail below.

In one or more embodiments, the configuration management system 106 may apply a hierarchical configuration model 108 to a request to process the request and generate deployment instructions. As used herein, applying the hierarchical configuration model 108 to a request is inclusive of at least one of the above-mentioned acts of filtering, fanning out, mapping, and parameterizing a request based on configuration instructions contained within nodes of the hierarchical configuration model 108. Thus, any of the features discussed in connection with the components 206-212 may be referred to at a high level as applying the hierarchical configuration model 108 to a request to generate or otherwise determine deployment instructions associated with deploying or otherwise processing a received deployment request.

In addition, as noted above, deploying a request may refer to acts of deploying, decommissioning, or simply modifying a deployment or pre-deployment of network functions on the cloud computing system 102. For example, a request may include a request to start up and configure new instances of network functions. In one or more embodiments, a request may include a request to inject a configuration to one or more network functions that are previously deployed or pre-provisioned on server nodes of a particular deployment area. In one or more embodiments, the request includes instructions having a combination of instructions associated with deploying new network functions, modifying existing or previously deployed network functions, or decommissioning network functions.

As shown in FIG. 2, the configuration management system 106 includes a request filtering manager 206. The request filtering manager 206 may perform any acts related to filtering a request across a subset of deployment areas on the cloud computing system 102. By way of example, the request filtering manager 206 may determine a subset of deployment areas branches of the hierarchical configuration model 108 to determine whether to deploy network function instances on the indicated deployment areas while filtering out any deployments of network function instances on non-indicated deployment areas. As will be discussed in further detail below, the request filtering manager 206 may identify a subset of deployment areas based on specific deployment area branches indicated in the request or, in some instances, based on nodes of the hierarchical configuration model 108 that are referenced in the request which include pointers or indicators to specific deployment areas.

As further shown in FIG. 2, the configuration management system 106 includes a deployment fanout manager 208. The deployment fanout manager 208 may perform acts related to iterating the deployment request across any number of multiple network function instances. Indeed, where conventional deployment mechanisms generally involve a customer providing configuration parameters for each individual network function, the deployment fanout manager 208 may iterate configuration instructions from one or more nodes of the hierarchical configuration model 108 across any number of network function instances as indicated within a request.

As an illustrative example, where a deployment request includes instructions to deploy one hundred network functions of a particular type across ten regional groupings, the deployment fanout manager 208 may facilitate fanning out the request to one thousand network function instances in accordance with configuration instructions applicable to the different deployment areas associated with the regional groupings. In this example, the deployment fanout manager 208 may iteratively inject configuration management instructions within network function instances of an indicate network function type across the multiple deployment areas. This iteration of the network function instances may be done based on a single input (e.g., the request) without requiring that a customer indicate unique instructions for each of the network function instances. This is true even where specific configuration management instructions differ across the different deployment areas, such as where configuration management instructions differ between different deployment branches of the hierarchical configuration model 108. Additional detail in connection with fanning out a deployment request will be discussed below in connection with further examples.

As further shown in FIG. 2, the configuration management system 106 includes a function mapping manager 210.

The function mapping manager 210 may perform any acts related to mapping configuration instructions to specific deployment areas and/or specific types of network functions. For example, because different deployment areas may have different security requirements, different hardware generations, or other differences from other deployment area environments, configuration instructions may differ between different types of network functions when deployed at the different deployment areas. Thus, the function mapping manager 210 may perform acts related to mapping the network function types indicated within a request to specific configuration management instructions indicated within nodes of the hierarchical configuration model 108 of the respective deployment areas.

This mapping may be applicable to a wide variety of examples. For example, as noted above, different deployment areas may have different security requirements and/or different hardware that affects individual deployments. As another example, a request may include a description of the deployment within the request API call, but provisioning the configuration may differ between different types of network functions. For example, the function mapping manager 210 may map a configuration differently for AMFs than for SMFs when performing the act of deploying the network function instances. It will be appreciated that the acts related to mapping configuration instructions to the respective instances may be based on configuration management instructions included within the nodes of the hierarchical configuration model 108.

As further shown in FIG. 2, the configuration management system 106 may include a function parameterization manager 212. Similar to the function mapping manager 210, the function parameterization manager 212 may perform acts related to individualizing deployment of configuration management instructions for the individual instances of the network functions. As an example, certain object types may benefit from having specific fields that differ per instance of network functions. In this example, the function parameterization manager 212 may identify and inject the specific field values within the configuration instructions for the respective network function instances. For instance, a plurality of network function instances may have similar configuration values, but have different internet protocol (IP) addresses injected therein by the function parameterization manager 212. It will be appreciated that the acts related to parameterizing different fields of the individual network function instances may be based on information contained within the nodes of the hierarchical configuration model 108.

As noted above, the server device(s) 104 may include a data storage 214 that is maintained on or made accessible to the components of the configuration management system 106. The data storage 214 may maintain a variety of data and information thereon. In the example shown in FIG. 2, the data storage 214 may maintain the hierarchical configuration model 108 including any and all data included within the individual nodes of the hierarchical configuration model 108. The data storage 214 may include any additional data associated with the hierarchical configuration model 108.

Figure 3:
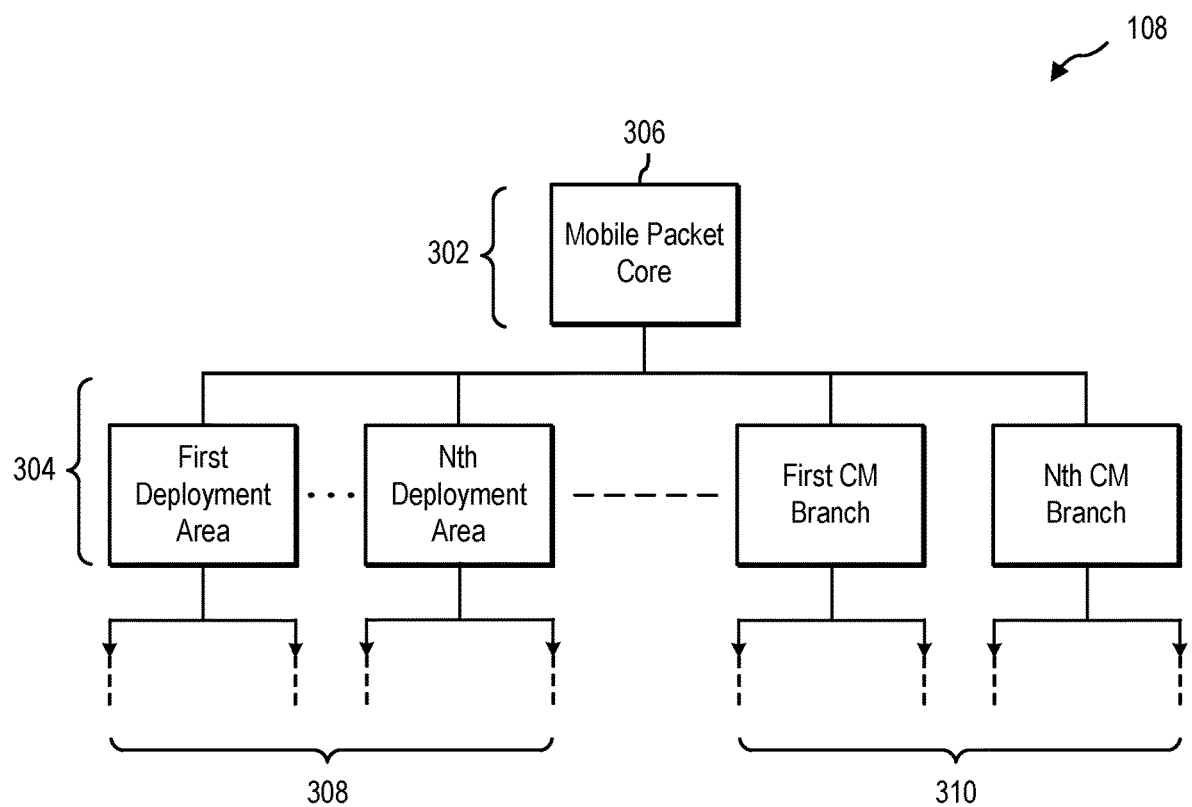
FIG. 3 illustrates an example implementation of a hierarchical configuration model in accordance with one or more embodiments.

Additional information will now be discussed in connection with example implementations of the hierarchical configuration model 108. For example, FIG. 3 illustrates an example hierarchical configuration model 108 including multiple levels of nodes that may be applied to a deployment request received by the configuration management system 106. The hierarchical configuration model 108 may include similar features and functionality discussed above in connection with other examples and application of the hierarchical configuration model 108.

As shown in FIG. 3, the hierarchical configuration model 108 includes first level nodes 302 and second level nodes 304. As further shown, the hierarchical configuration model 108 may include additional lower levels. Example features of the additional lower levels will be discussed in connection with example implementations of the hierarchical configuration model 108 shown in FIGS. 4-5.

As shown in FIG. 3, the first level nodes 302 include a top node 306. In one or more embodiments described herein, the top node 306 is referred to as a mobile packet core. In this example, the top node 306 is a base node that serves as a parent node for all branches and lower-level nodes of the hierarchical configuration model 108. Thus, each of the nodes that fall below the top node 306 (e.g., every node of the hierarchical configuration model 108) includes any configuration instructions of the top node 306 applicable thereto. Indeed, the top node 306 includes configuration instructions that are globally applicable to each of the multiple types of network functions as well as all of the possible deployment areas included within the cloud computing system 102 and that are referenced by the hierarchical configuration model 108.

Because the top node 306 is linked to each of the nodes within the hierarchical configuration model 108, any modification of the top node 306 will be applied to each node of the hierarchical configuration model 108. As a result, any modification of any policy or any addition (or removal) of a configuration instruction applied to the top node 306 will be applied or otherwise implemented on each network function across the cloud computing system 102.

As shown in FIG. 3, the hierarchical configuration model 108 may include a plurality of second level nodes 304. As noted above, the second level nodes 304 are children of the top node 306. Each of these second level nodes 304 may be referred to herein as branches of the mobile packet core (or branches of the top node 306).

As shown in FIG. 3, the second level nodes 304 may include different types of branches. By way of example and not limitation, the second level nodes 304 may include a set of deployment area branches 308. The deployment area branches 308 may include sets of nodes having configuration management instructions that are specifically applicable to defined areas (e.g., geographic areas) of the cloud computing system 102.

By way of example and not limitation, the deployment area branches 308 may include any number of deployment area nodes 310a-n. Each of the deployment area nodes 310a-n may include configuration management instructions that are applicable to any network function instance that is deployed within the respective deployment area. For example, a first deployment area node 310a may be associated with a first datacenter (or other grouping of server nodes) and include a set of configuration management instructions that are applicable to any network function deployed on the first datacenter. In this example, the configuration management instructions of the first deployment area node 310a may be implemented in addition to the globally applicable configuration management instructions indicated by the top node 306 (e.g., the mobile packet core).

In one or more embodiments, the deployment area branches 308 may include instructions that relate primarily to lifecycle configuration management of the respective network functions. For example, while not strictly limited to lifecycle management instructions, the deployment area branches 308 may include configuration instructions related to setting up network function instances of indicated network function types and setting up the network function instances to receive injection of additional configuration data (e.g., configuration management (CM) instructions) that include policies and rules that restrict or otherwise govern how the different network functions communicate and operate within the respective computing environments.

Each of the additional deployment area nodes may include similar or different sets of configuration management instructions that are applicable to network functions deployed on the respective deployment areas. Additional information in connection with an example deployment area branch of the hierarchical configuration model 108 will be discussed below in connection with FIG. 4.

Also shown in FIG. 3, and provided by way of example, the second level nodes 304 may include a set of configuration management branches 312. The configuration management branches 312 may include a set of nodes having configuration management instructions that are applicable to specific service areas, specific types of network functions, or other groupings of configuration instructions included within the respective branches of the hierarchical configuration model 108.

By way of example, the configuration management branches 312 may include any number of configuration management nodes 314a-n. For example, a first configuration management node 314a may be applicable to a specific grouping of configuration management instructions. Other deployment management nodes may be applicable to other groupings of configuration management instructions. Additional detail in connection with example configuration management branches will be discussed below in connection with FIG. 5.

In contrast to the deployment area branches 308, the configuration management branches 312 may not necessarily be associated with a specific deployment area. Rather, specific nodes of the configuration management branches 312 may include indicators that point to specific deployment areas of the cloud computing system 102 referenced within the hierarchical configuration model 108.

For example, the first configuration management node 314a may include a reference to a first deployment area node 310a. As a result, when applying the hierarchical configuration model 108 to a received deployment request that references the first configuration management node 314a (or any nodes that are children of the first configuration management node 314a), the indicated configuration management instructions may be applied to network function instances on the first deployment area. In addition, any configuration management instructions included within the first deployment area node 310a will similarly be applied to network function instances deployed in response to the received deployment request.

It will be noted that while many examples described herein relate specifically to an example hierarchical configuration model 108 that is applied to any and all deployment requests, in one or more implementations, the configuration management system 106 may make use of different hierarchical configuration models to process particularly unique deployment requests. For example, a first hierarchical configuration model may be used in processing requests from a first set of customers while a second hierarchical configuration model may be used in processing requests from a second set of customers. For instance, a first set of customers may refer to a vast majority of users of the cloud computing system 102 while a second set of customers may refer to a governmental entity or other entity that requires dedicated computing resources apart from a general group of customers. In this example, a first hierarchical configuration model having a first mobile packet core and associated branches may be applied to requests originating from any of the first set of customers while the second hierarchical configuration model having a second mobile packet core and similar or different associated branches may be applied to requests originating from any of the second set of customers.

Figure 4:
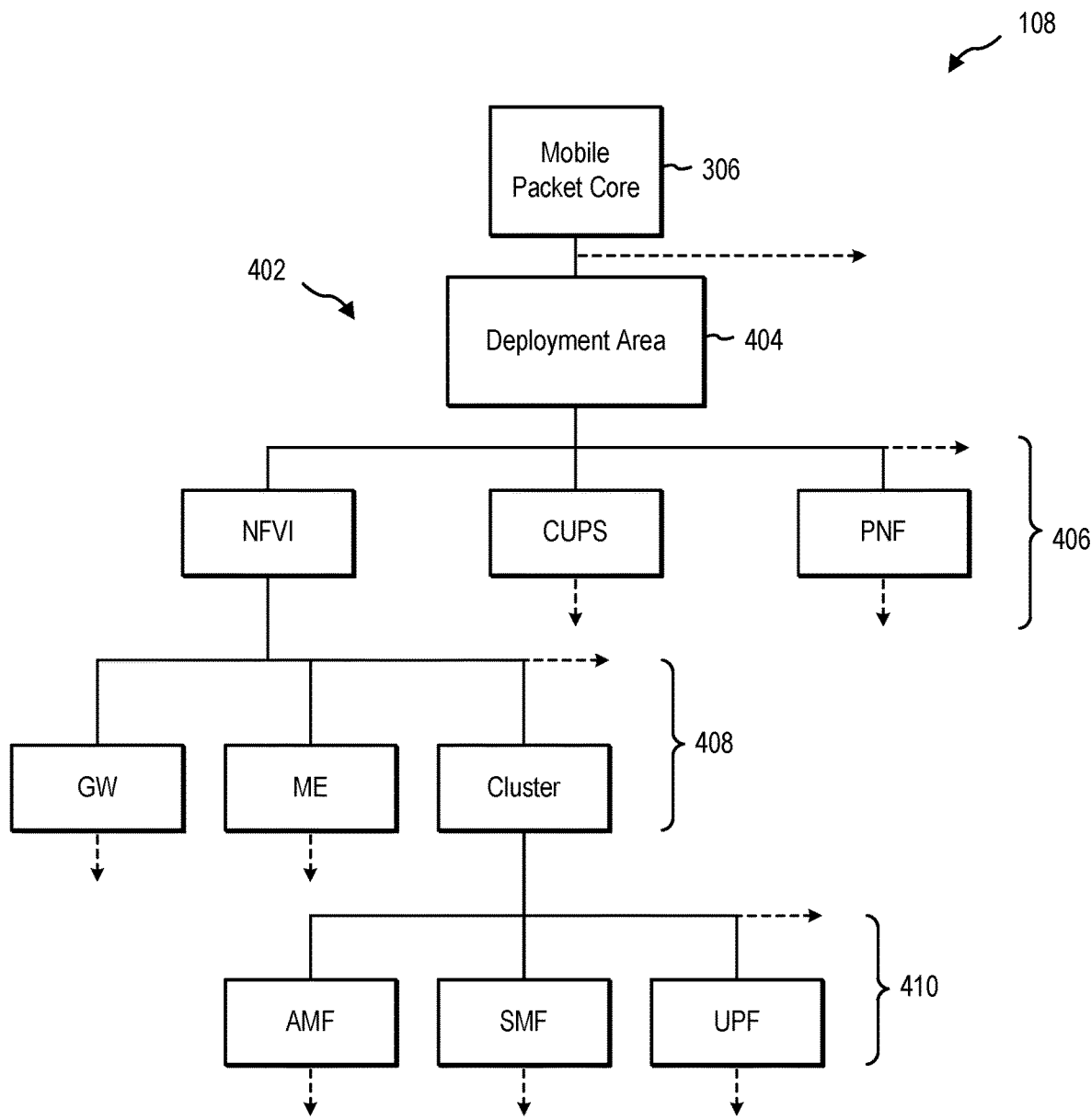
FIG. 4 illustrates example branch of a hierarchical configuration model in accordance with one or more embodiments.

Additional detail will now be discussed in connection with an example deployment area branch of the hierarchical configuration model 108. For example, FIG. 4 illustrates an example deployment area branch 402 of the hierarchical configuration model 108. As shown in FIG. 4, the hierarchical configuration model 108 may include the top node 306 (e.g., a mobile packet core). The hierarchical configuration model 108 may additionally include a deployment area node 404 having any number of lower-level nodes associated therewith. For ease in explanation, FIG. 4 shows a single deployment area branch from a plurality of deployment area branches included within the hierarchical configuration model 108. As such, features and functionalities described in connection with the illustrated deployment area branch 402 may apply to other deployment area branches (as well as configuration management branches).

As shown in FIG. 4, the deployment area node 404 may include a plurality of third level nodes 406. In this example, the third level nodes 406 may include configuration management instructions applicable to different varieties of network functions. For instance, the third level nodes 406 may include a network function virtualization infrastructure (NFVI) node associated with virtualized network functions, a control and user plane separation (CUPS) node, and physical network function (PNF) node. Each of these nodes may include lower levels of nodes associated with different types of network functions that can be categories within the respective third level nodes 406.

As an example in connection with the NFVI category of network functions, the NFVI node may include a set of fourth level nodes 408 including variations on the types of network functions that may be deployed within the category of network functions associated with the NFVI node. For example, the fourth level nodes 408 may include one or more gateway (GW) nodes, one or more management entity (ME) nodes, and a cluster node. Each of these nodes may include configuration management instructions (e.g., lifecycle management and/or configuration management) that are applicable to network functions of the associate type(s) within the category of NFVI functions on the deployment area.

As a further example, the cluster node may include a plurality of fifth level nodes 410 branching therefrom and corresponding to network function types that fall under the cluster (e.g., Kubernetes cluster) category of NFVI network functions. More specifically, the fifth level nodes 410 may refer to a plurality of nodes corresponding to types of containerized virtual network functions that are managed by a cluster (e.g., a Kubernetes cluster) on the corresponding deployment area. Examples of the fifth level nodes include an access and mobility management function (AMF) node, a session management function (SMF) node, user plane function (UPF) node, and any additional nodes corresponding to containerized network function types.

As noted above, each of the nodes illustrated in FIG. 4 are provided by way of example and different deployment area branches may include similar or different branches of nodes corresponding to similar or different types of network functions and associated configurations. Moreover, as discussed herein, each of the nodes may include configuration instructions that are specific to the deployment area, and which may differ (or be similar) to nodes that reference similar network function types that are contained in other deployment area branches.

Figure 5:
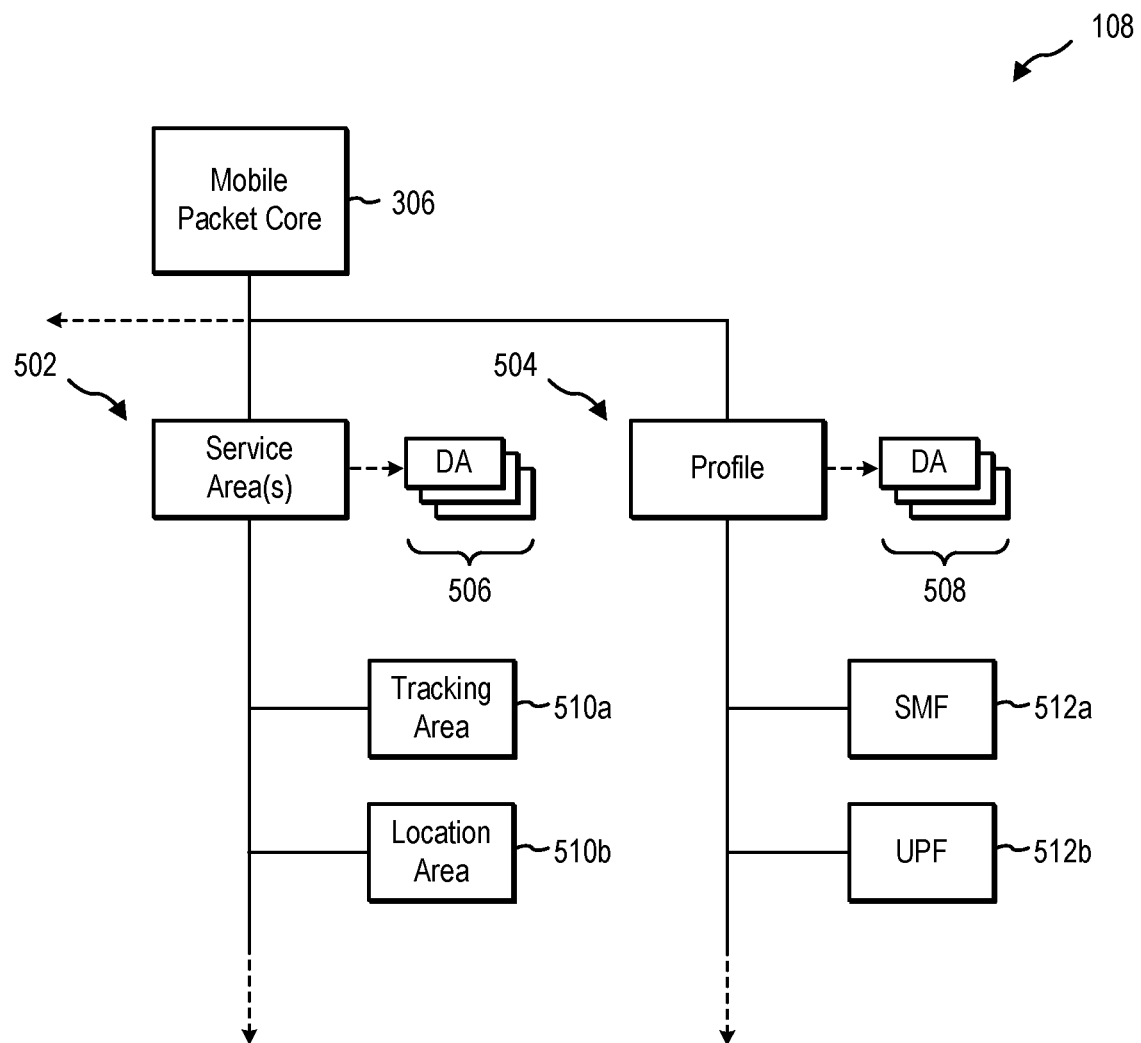
FIG. 5 illustrates additional example branches of a hierarchical configuration model in accordance with one or more embodiments.

Additional information will now be discussed in connection with an example set of configuration management branches of the hierarchical configuration model 108. For example, FIG. 5 illustrates a first example configuration management branch 502 and a second example configuration management branch 504. As shown in FIG. 5, the hierarchical configuration model 108 may include the top node 306 (e.g., a mobile packet core). As shown in FIG. 5, each of the configuration management branches 502-504 are child branches of the top node 306. For ease in explanation, FIG. 5 illustrates two configuration management nodes. Nevertheless, the hierarchical configuration model 108 may include any number of configuration management nodes having corresponding sets of nodes associated therewith. As such, features and functionalities described in connection with the example branches shown in FIG. 5 may apply to other configuration management branches not explicitly shown herein.

In each of the configuration management branches 502-504, one or more of the nodes that make up the branches may be associated with deployment area indicators that point to one or more deployment areas. For example, a second level node of the first configuration management branch 502 may include a first set of indicator(s) 506 that point to one or multiple deployment branches of the hierarchical configuration model 108. Similarly, a second level node of the second configuration management branch 504 may include a second set of indicator(s) 508 that point to one or multiple deployment branches of the hierarchical configuration model 108. Some or all of the points to the different deployment area branches may differ between the configuration management branches as may serve a particular embodiment.

In the illustrated example, the first configuration management branch 502 may refer to a service area branch. In one or more embodiments, the service area branch 502 is associated with a particular service area, and may be applied to any set of network functions that fall within a particular service area. As an example, a deployment request may indicate a set of network functions with a responsibility over a specific service area (e.g., a geographic area). This service area may be referenced by a service area node, which may include points to specific deployment branches that are included within the indicated service area. This service area and associated deployment area points may provide a filtering mechanism that instructs the configuration management system 106 to deploy network functions tasked with providing services or resources to deployment areas that fall within the indicated service area while also instructing the configuration management system 106 to avoid deploying network functions at deployment areas that do not fall within the indicated service area.

As further shown in FIG. 5, the service area node may include one or more lower-level nodes that provide additional configuration management instructions to network functions and other services that fall within the hierarchy of the first configuration management branch 502. For example, a first third-level node in the first configuration management branch 502 may include a tracking area node including tracking area instructions applicable to network functions deployed within the indicated service area (and identified deployment areas). As another example, a second third-level level node in the first configuration management branch 502 may include a location area node including location area instructions applicable to network functions deployed within the indicated service area.

While not explicitly shown in FIG. 5, each of the nodes may include further instructions limiting application of the configuration management instructions to specific types of network functions on the indicated deployment areas. As an example, the first third-level node 510*a* may include an instruction limiting application of configuration management instructions of the respective node to a first category of network functions while the second third-level node 510*b* may include an instruction limiting application of configuration management instructions of the respective node to a second category of network functions.

As shown in FIG. 5, the second configuration management branch 504 may refer to a profile branch. Similar to the first configuration management branch 504, the profile branch (and/or individual nodes within the branch) may be associated with one or more deployment areas. For example, as shown in FIG. 5, the profile node of the second configuration management branch 502 may include a set of indicators 508 pointing to one or more corresponding deployment area branches of the hierarchical configuration model 108. Lower-level nodes may similarly include pointers to specific deployment area branches of the hierarchical configuration model 108.

As shown in FIG. 5, the profile node may include lower-level nodes including configuration management functions to be applied to particular profiles of network functions. By way of example, the lower-level nodes may include an SMF profile node 512*a* including configuration instructions that may be applied to the SMF profile of SMF network functions. As further shown, the lower-level nodes may include a UPF profile node 512*b* including configuration instructions that may be applied to the UPF profile of UPF network functions.

The above configuration management branches are provided by way of example and are not intended to be limiting in scope to the specific types of configuration management instructions described and illustrated herein. For example, additional configuration management branches may include routing configuration branches, 3G branch protocols, 4G branch protocols, 5G branch protocols, network slice branches, and any other branches that may provide specific configuration management instructions that may be applied to network functions on various deployment areas.

As noted above, each of the nodes of the hierarchical configuration model 108 may be modified over time based on changing computational requirements, security policies, or addition of new network function types that may be deployed on the cloud computing system 102. Moreover, one or more nodes may be removed or added to provide a dynamic telecommunications network on the cloud computing system 102 with services that can be enhanced and expanded over time within the framework provided by the hierarchical configuration model 108.

Figure 6:
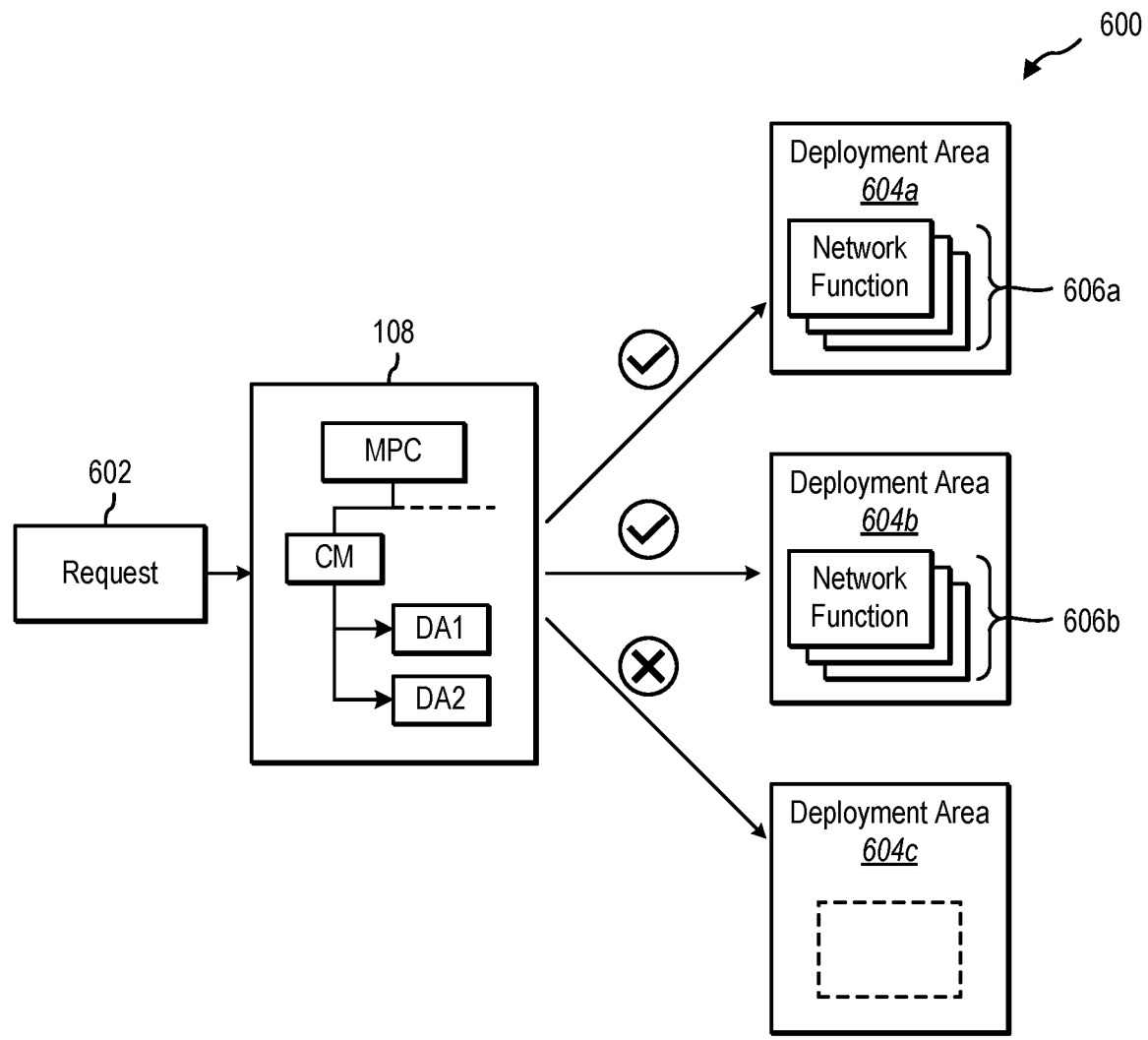
FIG. 6 illustrates an example implementation of a hierarchical configuration model in facilitating filtering and fanning out of a deployment request in accordance with one or more embodiments.

FIG. 6 illustrates an example implementation of the hierarchical configuration model 108 in accordance with one or more embodiments described herein. In particular, FIG. 6 illustrates an example environment 600 in which a received request 602 is processed by the configuration management system 106 by applying a hierarchical configuration model 108 to the request 602 and generating deployment instructions based on configuration management instructions included within the hierarchical configuration model 108.

In particular, as shown in FIG. 6, a configuration management system 106 may receive a request 602. In accordance with examples described herein, the request may include an API call that references portions (e.g., nodes, branches) of the hierarchical configuration model 108. In this particular example, the request 602 may reference a configuration management branch of the mobile packet core and includes indicators pointing to first and second deployment areas (e.g., indicated as DA1 and DA2 within the hierarchical configuration model 108).

Upon receiving the request 602, the configuration management system 106 may apply the hierarchical configuration model 108 to the request 602. In applying the hierarchical configuration model 108 to the request 602, the configuration management system 106 may identify the configuration management node of the hierarchical configuration model 108 based on content included within the request 602 that references the corresponding node(s) of the hierarchical configuration model 108.

The configuration management system 106 may additionally determine that the configuration management branch references a first deployment area 604a and a second deployment area 604b corresponding to deployment area branches of the hierarchical configuration model 108. Thus, as discussed above, the configuration management system 106 may identify configuration management instructions included within the identified configuration management branch and the indicated deployment area branches (as well as any instructions included within the mobile packet core node) to determine how to deploy a plurality of network functions across a subset of example deployment areas 604a-c shown in the example environment 600.

As shown in FIG. 6, the configuration management system 106 may deploy network function instances across a subset of deployment areas indicated within the identified configuration branch of the hierarchical configuration model 108. In particular, the configuration management system 106 may deploy a first set of network function instances 606a on the first deployment area 604a and a second set of network function instances 606b on the second deployment area 604b. This may be done without deploying or modifying any existing network function instances currently or previously deployed on the third deployment area 604c.

Thus, as shown in FIG. 6, the configuration management system 106 may facilitate filtering the request 602 by limiting deployment of the network functions on the first and second deployment areas 606a-b. The configuration management system 106 may additionally fanout the request by iterating the configuration management instructions to the network function instances in accordance with the relevant set of configuration management instructions that are applicable to the network function instances based on the hierarchy of configuration management instructions included within the nodes of the hierarchical configuration model 108.

Moreover, while not specifically shown in FIG. 6, the configuration management system 106 may perform additional steps of mapping one or more configuration instructions across the different network function instances based on unique characteristics of the network function type(s) and/or deployment area. Further, the configuration management system 106 may parameterize the network function instances by modifying or otherwise determining specific configuration fields (e.g., IP addresses) on a per-instance basis.

Figure 7:
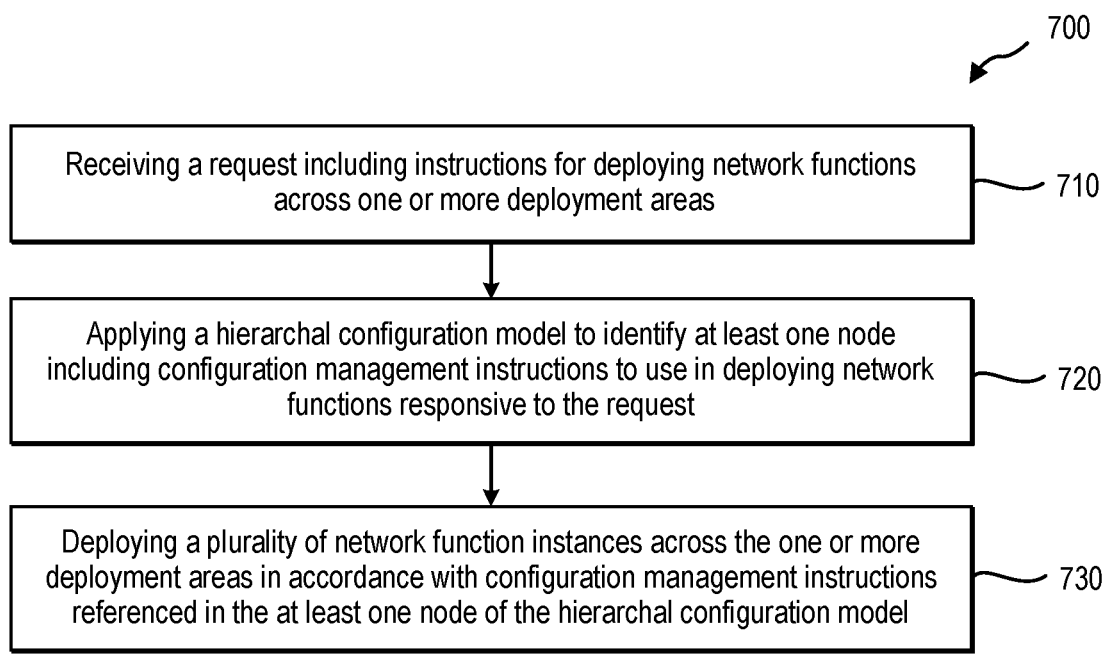
FIG. 7 illustrates a series of acts for receiving and processing a request to deploy a plurality of network functions in accordance with one or more embodiments described herein.

Turning now to FIG. 7, this figure illustrates an example flowchart including series of acts for processing a deployment request based on configuration instructions included within a hierarchical configuration model. While FIG. 7 illustrates acts according to one or more embodiments, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device (e.g., input device, gaming console, client device) to perform the acts of FIG. 7. In still further embodiments, a system can perform the acts of FIG. 7.

For example, FIG. 7 illustrates a series of acts 700 related to receiving and processing a deployment request based on configuration instructions included within a hierarchical configuration model. As shown in FIG. 7, the series of acts 700 includes an act 710 of receiving a request including instructions for deploying network functions across one or more deployment areas. In one or more embodiments, the act 710 includes receiving a request including instructions for deploying a plurality of network functions across a subset of deployment areas of a plurality of deployment areas of the telecommunications network. In one or more embodiments, the network functions are deployed in a core mobile network of a fifth generation (5G) telecommunications network.

As shown in FIG. 7, the series of acts 700 includes an act 720 of applying a hierarchical configuration model to identify at least one node including configuration management instructions to use in deploying network functions responsive to the request. In one or more embodiments, the act 720 includes applying a hierarchical configuration model to the request to determine deployment instructions responsive to the request, the hierarchical configuration model including a hierarchy of configuration management instructions. In one or more implementations, the act 720 includes identifying, based on the request, at least one node of the hierarchical configuration model associated with the subset of deployment areas of the telecommunications network. In addition, the act 720 may involve including configuration management instructions from the at least one node of the hierarchical configuration model within the deployment instructions responsive to the request.

As further shown in FIG. 7, the series of acts 700 includes an act 730 of deploying a plurality of network function instances across the one or more deployment areas in accordance with configuration management instructions referenced in the at least one node of the hierarchical configuration model. In one or more embodiments, the act 730 includes deploying a plurality of network function instances across the subset of deployment areas in accordance with configuration management instructions referenced in the at least one node of the hierarchical configuration model.

In one or more embodiments, the request is an application programming interface (API) call including a reference to at least one deployment area of the telecommunications network in accordance with a hierarchical structure of the hierarchical configuration model. In one or more embodiments, instantiating the plurality of network function instances is performed without receiving additional configuration instruction input after receiving the request.

In one or more embodiments, identifying the at least one node of the hierarchical configuration model includes identifying a branch of the hierarchical configuration model associated with a deployment area of the telecommunications network. In one or more embodiments, identifying the at least one node of the hierarchical configuration model includes identifying two or more branches of the hierarchical configuration model associated with multiple deployment areas of the telecommunications network.

In one or more embodiments, identifying the at least one node of the hierarchical configuration model includes identifying a configuration management branch including a set of configuration management instructions having a reference to at least one deployment area of the telecommunications network. In one or more embodiments, deploying the plurality of network function instances across the subset of deployment areas includes deploying the plurality of network function instances in accordance with the set of configuration management instructions on the at least one deployment area. In one or more embodiments, deploying the plurality of network function instances across the subset of deployment areas includes deploying the plurality of network function instances on the referenced at least one deployment area without causing additional network function instances to be deployed on additional deployment areas that are not referenced by the at least one node of the hierarchical configuration model.

In one or more embodiments, the hierarchical configuration model includes a top-level node having globally applicable configuration instructions that are applied to all incoming deployment requests. In one or more embodiments, the at least one node identified based on the request includes a node at a lower level than the top-level node.

In one or more embodiments, the request identifies a first configuration management branch including configuration management instructions. Further, in one or more implementations, the first configuration management branch references a first deployment area branch associated with a first deployment area of the telecommunications network and a second deployment area branch associated with a second deployment area of the telecommunications network. In one or more embodiments, a first deployment area branch includes a first set of associated configuration rules applicable to network functions deployed on the first deployment area. In one or more implementations, the second deployment area branch includes a second set of associated configuration rules applicable to network functions deployed on the second deployment area.

In one or more embodiments, deploying the plurality of network function instances includes deploying a first set of network function instances on the first deployment area in accordance with the configuration management instructions included within the first configuration management branch and the first set of configuration rules applicable to network functions deployed on the first deployment area. Deploying the plurality of network functions may further include deploying a second set of network function instances on the second deployment area in accordance with the configuration management instructions included within the first configuration management branch and the second set of configuration rules applicable to network functions deployed on the second deployment area.

Figure 8:
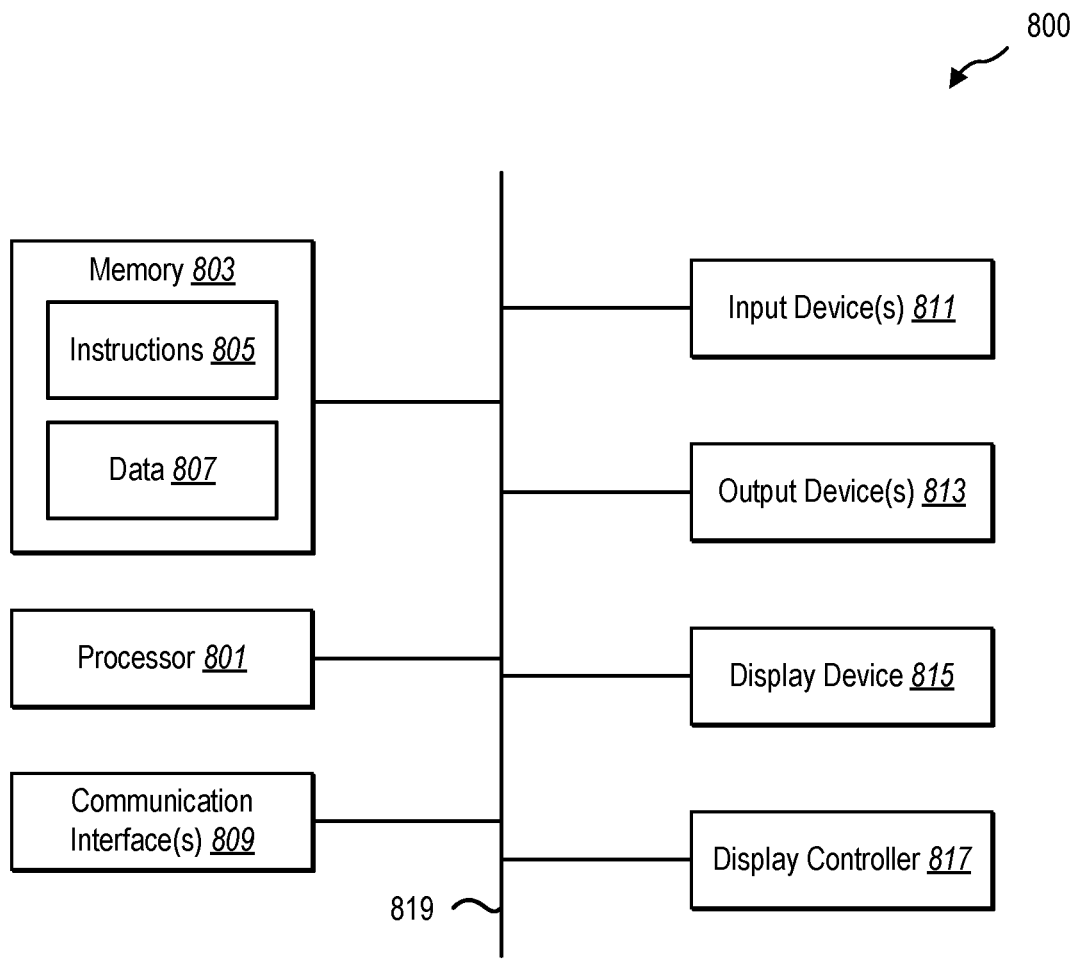
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth© wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and light pen (or light-sensitive wand). Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for managing configuration of network functions in a telecommunications network, the method comprising:
    receiving a request including instructions for deploying a plurality of network functions across a subset of deployment areas of a plurality of deployment areas of the telecommunications network;
    applying a hierarchical configuration model to the request to determine deployment instructions responsive to the request, the hierarchical configuration model including a hierarchy of branches and nodes, the nodes of the hierarchical configuration model containing configuration management instructions associated with deployment areas of the plurality of deployment areas, wherein applying the hierarchical configuration model to the request includes:
        identifying, based on the request, at least one node of the hierarchical configuration model associated with the subset of deployment areas of the telecommunications network; and
        including configuration management instructions from the at least one node of the hierarchical configuration model within the deployment instructions responsive to the request; and
    deploying a plurality of network function instances across the subset of deployment areas in accordance with configuration management instructions referenced in the at least one node of the hierarchical configuration model.

2. The method of claim 1, wherein the request is an application programming interface (API) call including a reference to at least one node of the hierarchical configuration model associated with at least one deployment area of the telecommunications network in accordance with a hierarchical structure of the hierarchical configuration model.

3. The method of claim 1, wherein identifying the at least one node of the hierarchical configuration model includes identifying a branch of the hierarchical configuration model associated with a deployment area of the telecommunications network.

4. The method of claim 1, wherein identifying the at least one node of the hierarchical configuration model includes identifying two or more branches of the hierarchical configuration model associated with multiple deployment areas of the telecommunications network.

5. The method of claim 1, wherein identifying the at least one node of the hierarchical configuration model includes identifying a configuration management branch including a set of configuration management instructions having a reference to at least one deployment area of the telecommunications network.

6. The method of claim 5, wherein deploying the plurality of network function instances across the subset of deployment areas includes deploying the plurality of network function instances in accordance with the set of configuration management instructions on the at least one deployment area.

7. The method of claim 5, wherein deploying the plurality of network function instances across the subset of deployment areas includes deploying the plurality of network function instances on the referenced at least one deployment area without causing additional network function instances to be deployed on additional deployment areas that are not referenced by the at least one node of the hierarchical configuration model.

8. The method of claim 1, wherein the hierarchical configuration model includes a top-level node having globally applicable configuration instructions that are applied to all incoming deployment requests.

9. The method of claim 8, wherein the at least one node identified based on the request includes a node at a lower level than the top-level node.

10. The method of claim 1, wherein instantiating the plurality of network function instances is performed without receiving additional configuration instruction input after receiving the request.

11. The method of claim 1,
wherein the request identifies a first configuration management branch including configuration management instructions, and
wherein the first configuration management branch references a first deployment area branch associated with a first deployment area of the telecommunications network and a second deployment area branch associated with a second deployment area of the telecommunications network.

12. The method of claim 11, wherein a first deployment area branch includes a first set of associated configuration rules applicable to network functions deployed on the first deployment area, and wherein the second deployment area branch includes a second set of associated configuration rules applicable to network functions deployed on the second deployment area.

13. The method of claim 12, wherein deploying the plurality of network function instances includes:
deploying a first set of network function instances on the first deployment area in accordance with the configuration management instructions included within the first configuration management branch and the first set of configuration rules applicable to network functions deployed on the first deployment area; and
deploying a second set of network function instances on the second deployment area in accordance with the configuration management instructions included within the first configuration management branch and the second set of configuration rules applicable to network functions deployed on the second deployment area.

14. The method of claim 1, wherein the network functions are deployed in a core mobile network of a fifth generation (5G) telecommunications network.

15. A system, comprising:
at least one processor;
memory in electronic communication with the at least one processor; and
instructions stored in the memory, the instructions being executable by the at least one processor to:
receive a request including instructions for deploying a plurality of network functions across a subset of deployment areas of a plurality of deployment areas of a telecommunications network;
apply a hierarchical configuration model to the request to determine deployment instructions responsive to the request, the hierarchical configuration model including a hierarchy of branches and nodes, the nodes of the hierarchical configuration model containing configuration management instructions associated with deployment areas of the plurality of deployment areas, wherein applying the hierarchical configuration model to the request includes:
identifying, based on the request, at least one node of the hierarchical configuration model associated with the subset of deployment areas of the telecommunications network; and
including configuration management instructions from the at least one node of the hierarchical configuration model within the deployment instructions responsive to the request; and
deploy a plurality of network function instances across the subset of deployment areas in accordance with configuration management instructions referenced in the at least one node of the hierarchical configuration model.

16. The system of claim 15, wherein identifying the at least one node of the hierarchical configuration model includes identifying two or more branches of the hierarchical configuration model associated with multiple deployment areas of the telecommunications network.

17. The system of claim 15, wherein identifying the at least one node of the hierarchical configuration model includes identifying a configuration management branch including a set of configuration management instructions having a reference to at least one deployment area of the telecommunications network.

18. The system of claim 15, wherein the hierarchical configuration model includes a top-level node having globally applicable configuration instructions that are applied to all incoming deployment requests, and wherein the at least one node identified based on the request includes a node at a lower level than the top-level node.

19. The system of claim 15, wherein instantiating the plurality of network function instances is performed without receiving additional configuration instruction input after receiving the request.

20. A method being implemented in a fifth generation (5G) telecommunications network, the method comprising:
receiving a request including instructions for deploying a plurality of network functions across a subset of deployment areas of a plurality of deployment areas of the telecommunications network;
applying a hierarchical configuration model to the request to determine deployment instructions responsive to the request, the hierarchical configuration model including a hierarchy of branches and nodes, the nodes of the hierarchical configuration model containing configuration management instructions associated with deployment areas of the plurality of deployment areas, wherein applying the hierarchical configuration model to the request includes:
identifying, based on the request, a node including configuration management instructions and references to branches of the hierarchical configuration model associated with the subset of the deployment areas; and
including configuration management instructions from the node and from the referenced branches of the hierarchical configuration model within the deployment instructions; and
deploying a plurality of network function instances across the subset of deployment areas in accordance with configuration management instructions referenced in the referenced branches of the hierarchical configuration model.

* * * * *